(12) United States Patent
Fournier

(10) Patent No.: US 9,589,689 B2
(45) Date of Patent: Mar. 7, 2017

(54) INSTALLATION COMPRISING A GLOVE BOX AND A GLOVE CHANGE DEVICE INCORPORATING MONITORING OF THE GLOVE CHANGE

(71) Applicant: Getinge La Calhene, Vendome (FR)

(72) Inventor: Bruno Fournier, Saint Ouen (FR)

(73) Assignee: GETINGE LA CALHENE, Vendome (FR)

( * ) Notice: Subject to any disclaimer, the term of this patent is extended or adjusted under 35 U.S.C. 154(b) by 118 days.

(21) Appl. No.: 14/367,616

(22) PCT Filed: Dec. 20, 2012

(86) PCT No.: PCT/EP2012/076427
§ 371 (c)(1),
(2) Date: Jun. 20, 2014

(87) PCT Pub. No.: WO2013/092882
PCT Pub. Date: Jun. 27, 2013

(65) Prior Publication Data
US 2015/0243392 A1    Aug. 27, 2015

(30) Foreign Application Priority Data
Dec. 23, 2011 (FR) .................................... 11 62374

(51) Int. Cl.
*G21F 7/053* (2006.01)
*B23P 19/04* (2006.01)
*B25J 21/02* (2006.01)
*B23P 6/00* (2006.01)

(52) U.S. Cl.
CPC .............. *G21F 7/053* (2013.01); *B23P 19/04* (2013.01); *B25J 21/02* (2013.01); *B01L 2300/022* (2013.01); *B23P 6/00* (2013.01); *Y10T 29/4973* (2015.01); *Y10T 29/49771* (2015.01); *Y10T 29/53022* (2015.01); *Y10T 29/53096* (2015.01)

(58) Field of Classification Search
CPC .. B01L 1/00–1/50; B01L 2300/021–2300/023; B08B 15/026;
(Continued)

(56) References Cited

U.S. PATENT DOCUMENTS

| 5,090,782 A | 2/1992 | Glachet et al. |
| 2012/0219388 A1 | 8/2012 | Arnau |
| 2012/0305647 A1* | 12/2012 | Lantheaume ...... G06K 7/10178 235/439 |

FOREIGN PATENT DOCUMENTS

| DE | 102006043686 A1 | 3/2008 |
| FR | 2652143 A1 | 3/1991 |

(Continued)

OTHER PUBLICATIONS

Translation of JP 2009225742 A, generated Jan. 8, 2016.*
(Continued)

*Primary Examiner* — Christopher Besler
*Assistant Examiner* — Matthew P Travers
(74) *Attorney, Agent, or Firm* — Pearne & Gordon LLP

(57) ABSTRACT

Installation comprising at least one glove box (2) provided with a box ring (8) comprising an RFID chip (28), a glove change device (22) provided with an RFID reader (34) and an electronic board (36), a used glove (10, comprising an RFID chip (32) in the box ring (8) and a new glove (110) comprising an RFID chip (132) in the glove change device (22) for the purposes of replacing the used glove (10), a computer (46) intended to gather and process the information read by the RFID reader (34) and stored temporarily in the electronic board (36).

16 Claims, 1 Drawing Sheet

(58) Field of Classification Search
CPC ... B23P 6/00; B23P 11/00; B23P 19/04; B25J 21/02; G21F 7/04; G21F 7/045; G21F 7/047; G21F 7/053; Y10T 29/4973; Y10T 29/49771; Y10T 29/49815; Y10T 29/49822; Y10T 29/49826; Y10T 29/53022; Y10T 29/53096; Y10T 29/531
See application file for complete search history.

(56) References Cited

FOREIGN PATENT DOCUMENTS

| FR | 2864235 | A1 | 6/2005 | | | |
|----|---------|----|--------|---|---|---|
| FR | 2951516 | A1 | 4/2011 | | | |
| JP | 2009225742 | A | * | 10/2009 | ............ | C12M 47/04 |
| WO | 2008/034665 | A1 | | 3/2008 | | |
| WO | 2011/069878 | A1 | | 6/2011 | | |

OTHER PUBLICATIONS

International Search Report for PCT/EP2012/076427 dated Feb. 6, 2013.
French Search Report for FR 11 62374 dated Jul. 31, 2012.
Written Opinion for PCT/EP2012/076427.
U.S. Appl. No. 14/384,787, "Sealed Mounting Device of an Interchangeable Member on an Extra Strong Containment Enclosure", filed Sep. 12, 2014.

* cited by examiner

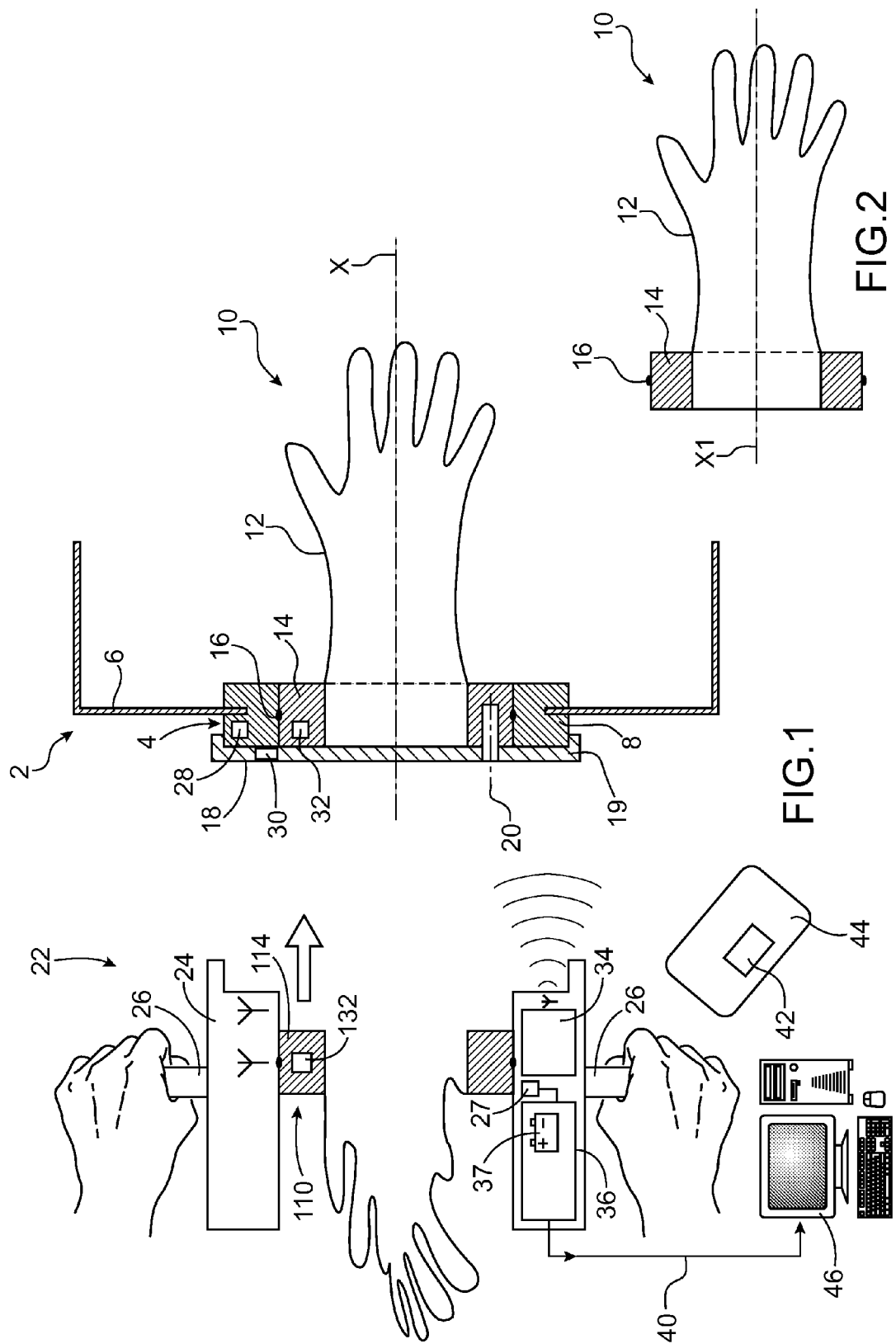

INSTALLATION COMPRISING A GLOVE BOX AND A GLOVE CHANGE DEVICE INCORPORATING MONITORING OF THE GLOVE CHANGE

TECHNICAL FIELD AND PRIOR ART

This invention relates to an installation comprising a glove box, a glove change device or objects fastened onto the glove box, wherein the traceability of said objects is improved.

The manipulation of toxic products is carried out inside glove boxes or isolators, which are accessed by using impervious gloves fastened onto a wall of the glove box or of the isolator in order to provide protection for the operator by means of impervious gloves.

The open end of a glove through which the operator inserts his hand is mounted on a rigid ring, whereon is mounted a seal.

This set comprised of the glove of the ring and of the seal forms a single-use product, intended to be used on a glove box or an isolator, for applications such as the manipulation or radioactive products in the nuclear industry or toxic products in the pharmaceutical industry.

This set connects to the glove box or to the isolator by the intermediary of a box ring sealingly fastened beforehand onto the wall of the box. The box ring therefore delimits an opening in the wall, which is sealingly closed by the glove, ring and seal set.

During a glove change, it is necessary to provide the continuity of the confinement, i.e. the protection of the operator. For this, a tool called "ejection barrel" makes it possible to replace a used glove with a new glove without breaking the confinement.

Gloves have an expiration date, beyond which it is no longer possible to guarantee their characteristics of a seal. Given the critical nature of a possible rupture in the confinement due to the dangerousness of the products manipulated, a glove must be replaced before its expiration date. A monitoring of this expiration date is therefore required.

Moreover, in installations comprising a large number of glove boxes, in turn provided with a large number of gloves, the monitoring of the date of each of the gloves becomes very complex.

Indeed, it is desirable to be able to identify all of the gloves of an installation, their location, their model and their expiration date.

One realizes that such monitoring, in the case where it is carried out by an operator manually, requires a substantial amount of time without being able to guarantee the reliability of the monitoring.

DISCLOSURE OF THE INVENTION

It is consequently a purpose of this invention to offer a glove box, gloves and a glove change device that makes it possible to identify the gloves and to monitor the change on a glove box or an isolator, more generally to monitor any object mounted on a glove box or an isolator.

The aforementioned purpose is achieved by an installation that implements the RFID technology (Identification by Radio Frequency) in order to provide safe and effective monitoring of the gloves or of the objects mounted on a glove box.

The invention implemented comprises a glove box, at least one glove provided with a ring mounted in a box ring integral with the wall, an immobilization ring of the glove ring in the flange and a glove change device. The glove ring, the box ring and the immobilization ring each comprise an RFID chip and the glove change device comprises an RFID reader able to communicate with the RFID chips in order to identify them and record the characteristics of the elements that carry them such as the location of the rings, the model of the gloves, the expiration date of the gloves, etc. in a database.

As such, each glove is recorded and is monitored and each glove change operation is recorded, which makes it possible to perform monitoring on the maintenance of the glove boxes.

In a particularly advantageous manner, the reader and the RFID chips can make it possible to secure the glove change operations.

For example, it can be detected that the immobilization ring has been correctly put back in place or if the new glove corresponds to the one expected.

Advantageously, the operator can also wear an RFID chip that identifies him. As such, it can be verified if the operator is authorized to make this glove change. Furthermore, this information makes it possible to supplement the database in order to make it as complete as possible.

In case of an anomaly, an alarm signal is advantageously emitted in order to alert the operator, and even a mechanical device prevents the continuation of the glove change procedure.

A subject-matter of this invention then is a glove change device on a glove box, said glove box comprising walls that delimit a closed box, at least one glove port carried out in one of the walls, said glove port comprising a box ring integral with the wall and delimiting a passage wherein a glove is intended to be sealingly mounted, said glove comprising a glove ring bearing a flexible portion intended to receive the hand of an operator, said glove change device comprising a body intended to receive a new glove, a mechanism able to apply a thrust force on the new glove in such a way as to provoke its putting into place in the glove port in place of a used glove, an RFID reader provided with at least one antenna intended to communicate with RFID chips carried by the gloves and by the box ring of the glove box, an electronic board connected to the RFID reader for storing the information received from said RFID chips.

Preferably, the glove change device comprises as many antennas as RFID chips with which it is intended to communicate.

The glove change device comprises advantageously an anti-collision mechanism allowing for communication with said chips successively.

The glove change device can comprise means for detecting the presence or the absence of a new glove mounted in its body. For example, the means for detecting comprise a mobile element of which the position is sensitive to the presence or to the absence of a new glove and an electric switch that sends a signal to the electronic board according to the position of the mobile element.

Very advantageously, the electronic board comprises means able to emit alarm and/or control signals according to the information received from said RFID cells. The alarm signals are for example audible and/or visual.

Preferably, the glove change device comprises mechanical means able to prevent the glove change, said means being activated by a control signal emitted by said electronic board.

Another subject-matter of this invention then is a glove change a glove box intended to isolate a volume in relation to an external environment comprising walls delimiting a closed box, at least one glove port carried out in one of the walls, said glove port comprising a box ring integral with the wall and delimiting a passage wherein a device is intended to be sealingly mounted, said box ring being provided with a first radiofrequency identification chip, referred to as RFID chip, intended to communicate with a radiofrequency identification reader, referred to as RFID reader, said RFID chip comprising information on said box ring.

Preferably, the glove box comprises an immobilization ring mounted on the box ring and on the device housed in said box in order to immobilize the device in relation to said box ring, said immobilization ring comprising a second RFID chip, intended to communicate with a radiofrequency identification reader, referred to as RFID reader, said second RFID chip comprising information on said immobilization ring Another subject-matter of this invention then is a glove change a device intended to be put into place in a glove port of a glove box according to the invention, and to sealingly close off the passage of the box ring, said device comprising a ring sealingly cooperating with the box ring, a seal provided on the external periphery of the device ring, said ring comprising a third RFID chip intended to communicate with an RFID reader, said third RFID chip comprising information on said device.

The device is advantageously a glove, and said ring of said device being a glove ring carrying a flexible portion intended to receive a hand of an operator. Alternatively, the ring could be closed off in such a way as to form a plug.

Another subject-matter of this invention then is a glove change an installation comprising at least one glove box according to the invention, a glove change device according to the invention, at least two gloves according to the invention, a glove being in place in a glove port, referred to as used glove, said glove box and a glove intended to be set into place in the glove change device for the purposes of replacing the used glove, referred to as new glove, a computer intended to gather and process the information read by the RFID reader and stored temporarily in the electronic board and means of connecting between the computer and the electronic board.

Advantageously, the installation comprises at least one fourth RFID chip for identifying an operator, said fourth RFID chip comprising information on the authorization of the operator to perform a glove change operation, and being intended to be worn by the operator.

In an example, the RFID chips are overmolded in the cell ring, and/or the glove ring and/or the immobilization ring. In another example, the RFID chips are added onto the cell ring, and/or the glove ring and/or the immobilization ring, for example by collage.

The data stored in said chips is for example the serial number of the glove mounted on each cell ring, the model of the glove or of the plug closing off the cell ring in the place of a glove, the expiration date of the immobilization ring, the date of the replacement of said glove, the name or number of the operator.

Another subject-matter of this invention then is a glove change method in an installation according to the invention, comprising the steps of:

a) setting in place of the glove change device in the vicinity of the glove port of which the glove is to be changed, and reading by the RFID reader of at least the first RFID chip of the box ring and of at least the third RFID chip of the glove ring of the used glove, b) setting in place of the new glove in the glove change device and reading the third RFID chip of the new glove by the RFID reader, c) positioning of the glove change device on the box ring, with possibly another reading of the first RFID chip of the box ring, d) actuating of the glove change mechanism, e) withdrawing the glove change device.

f) transferring data to the computer.

In an embodiment wherein the glove box comprises an immobilization ring, the step a) can also comprise the reading of the second RFID chip of the immobilization ring by the RFID reader and a step of withdrawing the immobilization ring prior to the step b).

The glove change method according to the invention can advantageously comprise a step after the step e) of reading chips of the box ring and of the glove.

The glove change method can comprise a step e1) of putting back in place of an immobilization ring on the glove port after the step e) and of reading the second chip of said immobilization ring by the RFID reader.

The glove change method comprising advantageously a step prior to the step a) of reading the fourth RFID chip for identifying the operator.

Very advantageously, the glove change method comprises, following the reading of the information of the RFID chip or chips by the RFID reader, a step of processing the data by the electronic board and a step of emitting an alarm and/or a control signal in the case of reading predetermined data.

For example, the processing of the data by the electronic board compares the data read by the RFID reader to a list of authorized or prohibited data, for example for the data that identifies the operator or the serial number of a glove and/or compares the date of the glove change or of the expiration of the immobilization ring to current date.

BRIEF DESCRIPTION OF THE DRAWINGS

This invention shall be better understood using the following description and annexed drawings wherein:

FIG. 1 diagrammatically shows a cross-section of an installation according to the invention prior to the glove change, FIG. 2 is a cross-section view of a glove shown alone.

DETAILED DISCLOSURE OF PARTICULAR EMBODIMENTS

In FIG. 1, a diagrammatical installation is shown of a glove box 2 provided with a glove port 4 formed in a wall 6 of the glove box 2. Preferably the wall 6 is transparent in order to allow the operator to view the inside of the glove box 6.

FIG. 1 shows the various elements of the glove box, of the gloves and of the glove change device and is diagrammatical and is used solely for the purposes of illustration to assist in understanding the invention.

The installation to which the invention applies is for example that described in document FR 2 652 143.

The glove port 4 comprises a ring 8 comprising a central passage of axis X, designated by "box ring".

The glove port 4 is closed off by a glove 10. The glove 10 comprises a flexible portion 12 intended to receive the hand and be arranged inside the glove box 6 and a glove ring 14 bordering an open end of the flexible portion through which the operator enters his hand. The glove 10 is shown alone in FIG. 2.

The outer diameter of the glove ring is equal to the inner diameter of the box ring 8. The glove ring 14 comprises on its external periphery a seal 16 intended to make the seal between the box ring 8 of the glove port 4 and the glove ring 14. The glove ring is shown diagrammatically; it comprises other elements not shown but which are not useful in understanding to the invention.

The glove ring 14 has an axis X1. The glove ring 14 is introduced into the box ring 8 in such a way that the axis X and the axis X1 are coaxial.

When the glove ring 14 is mounted in the box ring 8, the set formed as such has an annular-shaped external surface closed off in the central portion by the flexible portion of the glove.

Preferably an annular-shaped part 18, designated as "immobilization ring", is added onto the external surface of the box ring and glove ring set, blocking the movement of the glove and preventing an accidental dislodging. The immobilization ring 18 is bordered on its external periphery by an edge 19.

A pin 20 is advantageously provided to block in rotation the glove ring 14 and the box ring 8.

The installation further comprises a glove change device 22, designated as "ejection barrel". The latter is also shown highly diagrammatically.

The ejection barrel 22 comprises a tube-shaped body 24 intended to receive a new glove 110 intended to be placed instead of the used glove 10 in place in the glove port 4. The inner diameter of the body 24 is therefore substantially equal to the outer diameter of the glove ring 14. The ejection barrel 22 comprises two handles 26 in order to hold the barrel. The ejection barrel further comprises a mechanism not shown able to exert a thrust force on the glove ring 114 of the new glove 110 in position in the body. For example, the mechanism is of manual actuation, transforming a movement of rotation of the handles 26 into a movement of translation along the axis X of a pusher arranged in the body 24. The pusher is intended to exert a thrust force on the glove ring 114 of the new glove 110 in the direction of the glove ring 14 of the used glove 10 in order to provoke the ejection of the used glove 10 inside the glove box and its replacing with the new glove 110 without breaking the confinement. Alternatively, the mechanism can be motorized, and the pusher is displaced by a simple action on a control button by the operator.

The ejection barrel 22 comprises advantageously a sensor 27 making it possible to detect the carrying out of the glove change, this detection is transmitted to the electronic board. The date and the time of the glove change are recorded in the board.

The sensor 27 can be, for example, a mechanical finger that actuates an electric switch that sends a pulse to the electronic board when the new glove is no longer in the barrel. For example, the finger 27 is mounted slidingly in the body 24 according to a direction perpendicular to the axis of the tubular body. The latter is in retracted position when the glove ring 114 of the new glove 10 is in a position ready to be set into place in the glove port 4 and an extended position when the glove ring 114 of the new glove 110 is no longer in place, which means that it is mounted in the glove port 4.

The installation further comprises means for providing the monitoring of the gloves. These means are in particular intended to gather a certain amount of information on the gloves such as for example their location, their model, their expiration date, etc.

The means for providing the monitoring are of the transmission type by RFID (Identification by Radio Frequency) technology.

RFID technology is a method for memorizing and retrieving data at a distance by using markers called "RFID tags".

RFID tags generally include at least one antenna associated with an electronic chip which allows them to receive and to respond to radio requests emitted from a transmitter-receiver called a reader. The electronic chip of the tag generally contains at least the identification data.

As such, RFID technology makes it possible in particular to detect the tag via exchanges using radio waves between an RFID tag and the reader when it is located within its range in an electromagnetic field established by the latter.

This electromagnetic field is generally created using a radiofrequency generator located in the reader and using an antenna connected to this reader.

A first RFID chip 28 is provided on the box ring, a second RFID chip 30 on the immobilization ring and a third RFID chip 32 on the glove ring 14.

Preferably the tags of the RFID chips are passive and simply modify the electromagnetic field generated by the reader in order to transmit its identification data. The glove 110 comprises an RFID chip 132.

An RFID reader 34 is provided on the ejection barrel 22. An electronic board with a microcontroller 36 is also provided on the ejection barrel, and drives the RFID reader 34. This board 36 can be connected to a simple interface, for example a 2×16 character LCD alphanumeric screen+4 buttons, allowing for the configuration. Alternatively, the configuration can be carried out by connecting the electronic board to a computer. A means of connecting 40 between the RFID reader and a computer 46 is provided, for example of the Ethernet connection, wifi connection, USB connection, etc. type in such a way as to transmit to the latter the information gathered. Advantageously the electronic board 36 and the RFID reader 34 are powered by a battery 37 making the ejection barrel 22 highly maneuverable.

Very advantageously, the installation further comprises a fourth RFID chip 42 in order to identify the operator. For example, the fourth RFID chip 42 is inserted into a card 44 for example in the format of a "chip card" type. This card is intended to be worn by the operator. Alternatively, the operator can identify himself by using the interface of the ejection barrel or by connecting the ejection barrel to a computer and by identifying himself directly in the computer.

For example and in a non-restricted manner, the RFID chips 28, 30, 32 are incorporated, for example into the glove ring and the flange by overmolding, or by gluing of the RFID chip, for example of the self-sticking tag type, onto the part under consideration.

The operation of the installation according to the invention shall now be explained.

During a step a) the operator takes the ejection barrel. Very advantageously, thanks to the RFID chip provided on the card that the operator carries, the latter is identified automatically by approaching their card 44 to the ejection barrel, more particularly to the RFID reader 34 carried by the ejection barrel 22. During this approaching, the electronic board 34 of the ejection barrel 22, via its RFID reader 34, identifies the serial number of the operator and records it, as well as the current date and time.

Very advantageously, if the operator is not authorized 36, a signal is triggered by the electronic board, for example an audible and/or visual alarm such as blinking LEDs and the display of a message on the screen of the ejection barrel.

Very advantageously, the ejection barrel 22 is provided with a means for locking triggered when the operator detected is not compliant. For example, the means for locking can be formed by a mechanical finger released by a control of the electronic board and of which the extension provokes a mechanical impossibility of using the ejection barrel 22, in such a way that the glove change operation is mechanically prohibited.

During a following step, the operator approaches the ejection barrel 22 of the used glove 10 which is mounted in the box ring. During this manipulation, the RFID reader 34 reads the RFID chip 30 of the immobilization ring, the RFID chip of the box ring of the glove port and the glove ring 14 of the used glove 10. In this way, these three elements are identified. If the serial number of the box ring is listed on a "prohibited list" or is not listed on an "authorized list", the error will be reported for example as hereinabove by means of an audible and/or visual alarm and/or by a blocking of the ejection barrel.

The "prohibited list" or the "authorized list" is loaded beforehand into the memory, for example of the flash type, from the electronic board of the ejection barrel during a previous connection to the computer.

The choice of working with an "authorized list" or "prohibited list" is chosen according to the constraints. The "authorized list" offers more security, however in the case of an installation wherein all of the cell rings are not provided with RFID chips can complicate the operation of the installation.

During a following step, the operator removes the immobilization ring covering the box ring and the glove ring 14 of the used glove 10.

During a following step b), the operator then places the new glove 110 in the tubular body 24 of the ejection barrel 22. The electronic board 36 then identifies the presence of the RFID chip of the glove and records, for example the type of the glove, its serial number, the current date and time. Advantageously, if the new glove 110 is already expired and/or does not have the correct reference, a signal is emitted as in the preceding steps. A glove will be considered as having expired if its expiration date is prior to the scheduled date for the next replacement. This date for the next replacement can be either a fixed date (for example: the glove is replaced every year, the second week of January) or a date calculated using the date of replacement (for example: the glove has to be replaced at the latest one year after it is put into place). Thanks to the computerized data contained in the electronic board 36, it is possible to consider the various rules for certain glove ports, thanks to their identification by serial number, for example for a critical zone requiring a higher replacement frequency.

During a following step c), the operator positions the ejection barrel 22 on the box ring and the glove ring 14 of the used glove 10. The box ring being itself provided with an RFID chip, it is identified in the same way by the reader of the ejection barrel 22, the latter then reads its serial number, the current date and time. Advantageously, if the box ring brought close is not the same as that that had been brought close in the step a), an alarm signal is emitted. As such, the operator is prevented for committing an error between detecting the box ring of which the glove has to be changed and an adjacent box ring.

During a following step d), the operator carries out the glove change. He actuates the ejection barrel 22, an axial thrust force is then applied on the glove ring 114 of the new glove 110, which itself applies a thrust force on the glove ring 14 of the used glove 10. The latter 14 is then ejected into the glove box and the glove ring 114 of the new glove 110 takes its place in the box ring. When the ejection barrel 22 is provided with the sensor 27 for detecting the presence of the new glove 10, the signal of the sensor 27 changes state, switching from a detection of a glove to an absence of detection, which is interpreted as having carried out the glove change.

The used glove 10 is then eliminated via a waste exit of the glove box.

During a following step e), the operator withdraws the ejection barrel 22 and sets in place the immobilization ring and locks it using the pin. According to the expiration date of the immobilization ring, the operator will either have to put back into place the immobilization ring that was removed in the step a), or replace it with a new immobilization ring.

Preferably, during a following step, the operator again approaches the ejection barrel 22 to identify the immobilization ring, which makes it possible to record the time the ring is put back into place and to record the new immobilization ring where applicable.

This manipulation, allows the RFID reader to identify, in addition to the immobilization ring, all of the other elements in place, by the intermediary of their respective RFID chips: the box ring and the new glove 110.

Advantageously, during this step one and/or the other of the following verifications can be carried out:

- has the operator indeed approached the barrel of the box ring of which the glove has just been changed?
- is the immobilization ring indeed present and is its expiration date compliant, i.e. will it not be expired on the scheduled replacement date of the glove which has just been mounted?

If one and/or the other if these verifications is not positive, an error message explaining the incident is displayed, advantageously accompanied by alarm signals similar to those described can be issued.

During a following step f), the operator connects the ejection barrel to the computer using means of connecting 40. The computer then retrieves the connection data temporarily stored in the electronic board 36. Advantageously the memory of the electronic board 36 is sufficient to prevent having to unload the data too frequently.

The software provided on the computer then makes it possible to memorize all of the glove change data, to process the latter and to provide very useful information for the management of the replacement of gloves such as:

a) the list of the gloves to be changed in the short term, i.e. the list of gloves approaching the use-by date)

b) the list of immobilization rings to be changed in the short term, c) change statistics per operator, d) data on the duration of the glove change steps Other information can also be provided by the software according to the needs of the user of the installation Advantageously and as is shown, the ejection barrel 22 is provided with an RFID reader 34 and with several antennas, all connected to the RFID reader.

For the purposes of clarity in the single figure, the electronic connection between each antenna and the RFID reader 34 is not shown.

This embodiment has for advantage to simplify the canon. Moreover, the electrical consumption is reduced in relation to a reader provided with several antennas, which allows for a battery power supply of reduced size. The manipulation of the ejection barrel is then simplified. In addition, a glove box generally comprises at least two gloves in order to allow for two-hand manipulation by the operator, using several antennas prevents the risk of reading RFID chips of an adjacent glove on the glove box. However the use of an RFID reader and a single antenna does not depart from the scope of this invention.

The RFID reader is able, under normal operation of the installation, to see in its field several RFID chips, five chips in the example shown: the RFID chip of the new glove, the RFID chip of the used glove, the RFID chip of the immobilization ring, the RFID chip of the box ring and the RFID chip of the identification card of the operator. The RFID reader comprises an anti-collision mechanism in order to allow the latter RFID to communicate successively with each of the RFID chips.

The various antennas are positioned in such a way as to sufficiently approach these various RFID chips. There are several anti-collision techniques known to those skilled in the art. For example the temporal method can be implemented. In the temporal method, the reader, after having detected a collision (reception of "cacophony" of signals from the various RFID chips that simultaneously answered to a request from the reader), sends a specific request indicating to each chip that it must respond after a random period of time. As such the probability of a collision decreases sharply. If one is produced again even so, the process is repeated until the communication is successful.

In the case of an installation in the nuclear industry, it is possible that the RFID chip of the used glove is damaged following prolonged exposure to radiation. This will result either in a silent RFID chip, or in an RFID chip that is returning an incorrect serial number. In both cases, the RFID chip can be ignored, without this jeopardizing monitoring since this chip will have already been plotted during its installation, and the RFID chip of the new glove has not yet been exposed to radiation, it will operate correctly. The case of an incorrect serial number will be processed for example by a redundancy and verification mechanism, for example of the "CRC" (Cyclic Redundancy Check) type.

Concerning the RFID chip of the glove port, the latter is located in or on the box ring, more preferably in such a way as to be outside of the box. Furthermore, it can advantageously be provided that a sufficient thickness of material of the glove port protect the chip. This entails the chip having to be placed in the vicinity of the external surface of the glove port.

Preferably, it is provided that the chip can easily be replaced.

For example if it is located in the glove port, a housing will be provided for the chip closed by a movable cover, or it will be of the self-sticking type fastened onto the external surface of the glove port.

Preferably, a signal can be provided in order to warn that the RFID chip cannot be read, when a glove change is detected without a box ring chip entering into the field of the RFID reader.

If in the case where the RFID chip of the box ring cannot be read, it can be provided, if the chip of the used glove is still operational, to use it to identify the box ring by using the database, that stored the serial number of the box ring during the preceding glove change.

The example of the installation described hereinabove applies the monitoring to the gloves mounted on glove boxes but the installation according to the invention can make it possible to monitor other objects mounted on the glove box, such as for example the plugs which can connect in the same way as the gloves in the cell rings for zones that are not used for long periods of time.

Thanks to the installation according to the invention, a monitoring is carried out in a centralized database by storing data such as:
 the serial number of the glove mounted on each cell ring,
 the model of the glove or of the plug closing off the cell ring in the place of a glove,
 the expiration date of the gloves and of the immobilization rings,
 the date of replacement,
 the name of the operator that carried out the replacement.

The database can gather the information for a glove box and advantageously for all of the glove boxes of a plant, for example for the manufacture of nuclear fuel.

Furthermore, the installation can be used very advantageously in order to prohibit incorrect manipulations, such as:
 the manipulation of the ejection barrel by an unauthorized operator,
 the replacing of a used glove with an expired glove,
 forgetting to put the immobilization ring into place,
 using an immobilization ring that has expired,
 the glove change on a cell ring not scheduled for a change.

The installation according to the invention thus makes it possible advantageously to provide maximum protection against incorrect manipulations, able to jeopardize the safety of the operators, prevent omitting a step in the process of changing a used glove, and to prevent the use of components of which the expiration date has not been exceeded.

Note that the distances for communication between the RFID reader and the RFID chips according to the invention are low, for example less than a few centimeters, since the ejection barrel comes to press against the glove port and contains the new glove ring.

Various standard frequencies exist for the RFID technology: 125 kHz, 13.56 MHz, 865 MHz in Europe, 868 MHz in Europe, 915 MHz in the USA, 2.45 GHz, 5.8 GHz. The lowest frequencies allow for better penetration through materials. The highest frequencies allow for higher communication speeds. In this invention although the quantity of information exchanged between the RFID chip and the reader remains low, a sufficiently rapid communications speed is required for the anti-collision mechanism. In this way, a frequency of at least 13.56 MHz is preferred for this invention.

By way of example, a miniature HF 13.56 MH RFID module can be used: SkyeModule® M1-mini, the various antennas would be connected to the reader by the output provided for the external antenna.

The invention claimed is:
1. An installation comprising:
 at least one glove box configured to isolate a volume in relation to an external environment comprising walls delimiting a closed box, at least one glove port carried out in one of the walls, said glove port comprising a box ring integral with the wall and delimiting a passage wherein a device is intended to be sealingly mounted, said box ring being provided with a first radio fre- quency identification chip, said RFID chip comprising information on said box ring;

at least two gloves including a new glove and a used glove, the at least two gloves each being provided with an RFID chip;

a glove change device comprising a body intended to receive the new glove, a mechanism able to apply a thrust force on the new glove in such a way as to provoke its setting into place in the glove port in place of the used glove, an RFID reader provided with at least one antenna intended to communicate with the RFID chips carried by the at least two gloves and by the box ring of the glove box, and an electronic board connected to the RFID reader for storing the information received from said RFID chips;

the used glove being configured to be put into place in the glove port of the glove box and having a glove ring bearing a flexible portion intended to receive the hand of an operator, the used glove being in place in the glove port, said glove box and the new glove being configured to be put into place in the glove change device for the purposes of replacing the used glove; and a computer configured to gather and process the information read by the RFID reader and temporarily stored in the electronic board wherein the computer and the electronic board are configured to communicate with each other.

2. The installation according to claim 1, comprising at least one additional RFID chip for identifying an operator, said additional RFID chip comprising information on the authorization of the operator to perform a glove change operation, and intended to be worn by the operator.

3. The installation according to claim 1, wherein the RFID chips are overmolded in the box ring, and/or the glove ring and/or an immobilization ring.

4. The installation according to claim 1, wherein the RFID chips are attached onto the box ring, and/or the glove ring and /or an immobilization ring.

5. The installation according to claim 1, wherein the data stored in said RFID chips is the serial number of the glove mounted on each box ring, the model of the glove or of a plug closing off the box ring in the place of a glove, the expiration date of an immobilization ring, the date of replacement of said glove, the name or the number of the operator.

6. The installation according to claim 1, comprising an immobilization ring mounted on the box ring and on a device housed in said glove box in order to immobilize the device in relation to said box ring, said immobilization ring comprising an additional RFID chip, intended to communicate with the RFID reader, said additional RFID chip comprising information on said immobilization ring.

7. The installation according to claim 6, wherein the additional RFID chip is overmolded in the immobilization ring.

8. The installation according to claim 6, wherein the additional RFID chips is attached onto the immobilization ring.

9. A method of changing gloves using the installation according to claim 1, comprising the steps:
   a) setting up the glove change device in the vicinity of the glove port of which the used glove is to be changed, and reading by the RFID reader of at least the first RFID chip of the box ring and of at least the RFID chip of the used glove,
   b) putting in place of the new glove in the glove change device and reading the RFID chip of the new glove by the RFID reader,
   c) positioning of the glove change device on the box ring,
   d) actuating of the glove change mechanism,
   e) withdrawing of the glove change device,
   f) transferring data to the computer.

10. The method of changing gloves according to claim 9, wherein the glove box comprises an immobilization ring, the step a) further comprises a reading of an RFID chip of the immobilization ring by the RFID reader and a step of retracting the immobilization ring prior to the step b).

11. The method of changing gloves according to claim 10, comprising a step after the step e) of reading chips of the box ring and of the new glove.

12. The method of changing gloves according to claim 11, comprising a step e1) of putting back in place the immobilization ring on the glove port after the step e) and of reading the chip of said immobilization ring by the RFID reader.

13. The method of changing cloves according to claim 10, comprising a step prior to the step a) of reading an additional RFID chip for identifying the operator.

14. The method of changing cloves according to claim 10, comprising following the readings of the information of the RFID chips by the RFID reader, a step of processing the data by the electronic board and a step of emitting an alarm signal and/or a control signal in case of reading predetermined data.

15. The method of changing gloves according to claim 14, wherein the data processing by the electronic board compares the data read by the RFID reader with a list of authorized or prohibited data.

16. The method of changing gloves according to claim 15, wherein the data read by the RFID reader is the operator or the serial number of the new glove and/or the used glove and the data processing by the electronic board compares the date of the changing of the new glove and/or the used glove or the date of expiration of the immobilization ring with the current date.

* * * * *